United States Patent [19]

Dike et al.

[11] Patent Number: 5,341,052
[45] Date of Patent: Aug. 23, 1994

[54] ARBITER WITH TEST CAPABILITY AND ASSOCIATED TESTING METHOD

[75] Inventors: Charles E. Dike, Pleasant Grove, Utah; Farrell L. Ostler, Albuquerque, N. Mex.

[73] Assignee: North American Philips Corporation, New York, N.Y.

[21] Appl. No.: 141,462

[22] Filed: Oct. 21, 1993

Related U.S. Application Data

[63] Continuation of Ser. No. 892,543, Jun. 1, 1992, abandoned, which is a continuation-in-part of Ser. No. 804,254, Dec. 4, 1991.

[51] Int. Cl.$^5$ .................. G01R 19/145; H04Q 3/00
[52] U.S. Cl. .................. 307/518; 340/825.5; 395/325; 395/725; 307/514
[58] Field of Search ............ 307/518, 471, 514, 234, 307/463; 328/109, 119, 104, 137, 154; 395/725, 325; 340/825.5

[56] References Cited

U.S. PATENT DOCUMENTS

| | | | |
|---|---|---|---|
| 3,824,409 | 7/1974 | Patil | 307/518 |
| 3,986,042 | 10/1976 | Padgett et al. | 307/471 |
| 4,016,539 | 4/1977 | Nanya | 340/825.5 |
| 4,035,780 | 7/1977 | Kristick et al. | 395/725 |
| 4,402,040 | 8/1983 | Evett | 395/325 |
| 4,482,954 | 11/1984 | Vrielink et al. | 395/725 |
| 4,511,959 | 4/1985 | Nicolas et al. | 395/325 |
| 4,612,542 | 9/1986 | Pantry et al. | 340/825.5 |
| 4,620,118 | 10/1986 | Barber | 307/518 |
| 4,630,041 | 12/1986 | Casamatta et al. | 395/725 |
| 4,775,810 | 10/1988 | Suzuki et al. | 307/471 |
| 4,835,422 | 5/1989 | Dike | 307/518 |
| 4,835,672 | 5/1989 | Zenk et al. | 395/425 |
| 4,837,682 | 6/1989 | Culler | 395/325 |
| 4,841,178 | 6/1989 | Bisson | 307/518 |
| 4,851,996 | 7/1989 | Boioli et al. | 395/550 |
| 4,864,243 | 9/1989 | Reese | 307/518 |
| 4,872,004 | 10/1989 | Bahnick et al. | 340/825.5 |
| 4,881,195 | 11/1989 | DeLong et al. | 395/725 |
| 4,894,565 | 1/1990 | Marquardt | 307/518 |
| 4,933,901 | 6/1990 | Tai et al. | 365/189.07 |
| 4,962,379 | 10/1990 | Yasuda et al. | 340/825.51 |

OTHER PUBLICATIONS

Introduction to VLSI Systems, Addison-Wesley Publishing Co. 1980, pp. 260–261.
The Transactions of the IECE of Japan, vol. E65, No. 1, Abstracts, p. 84 "An Asynchronous Ring Arbiter with Built in Testability" Okamoto et al. (abstract only.
Proceedings, Real-Time Systems Symposium, Dec. 7–9, 1982, Los Angeles, Calif. "Cascaded Self-Checking Bus Arbiters for Multicomputer Systems" Courvoisier et al.
10th International Symposium on Fault-Tolerant Computing, Kyoto, Japan Oct. 1–3, 1980 "A Self Testing Arbiter Circuit for Multimicrocomputer Systems" Courvoisier et al.
IEE Proceedings, vol. 133, PT. E, No. 5, Sep. 1986 "Automatic Verification of Asynchronous Circuits Using Temporal Logic" Dill et al.

*Primary Examiner*—Timothy P. Callahan
*Assistant Examiner*—Toan Tran
*Attorney, Agent, or Firm*—Laurie E. Gathman

[57] ABSTRACT

An arbiter based on pairwise mutual exclusion produces an absolute priority signal (G) indicating that one of three or more requests ($R_1, R_2, \ldots R_N$) has gained absolute priority over all the other. At least one mutual-exclusion element ($20_1$ or $20_p$) in the arbiter is designed so that its pairwise priority determination car be reversed in response to at least one externally originated test signal ($T_1, T_2$ or $T_{M-1}, T_M$). By doing so after the requests have been asserted in a specified order, a priority conflict can be generated among the requests in order to check the conflict-resolution capability of the arbiter.

20 Claims, 3 Drawing Sheets

ARBITER WITH TEST CAPABILITY AND ASSOCIATED TESTING METHOD

ROSS-REFERENCE TO RELATED APPLICATION

This is a continuation of application Ser. No. 07/892,543, filed Jun. 1, 1992, now abandoned, which is a continuation-in-part of U.S. patent application Ser. No. 07/804,254, filed Dec. 4, 1991.

FIELD OF USE

This invention relates to an electronic priority-assignment device commonly referred to as an arbiter. More specifically, this invention relates to circuitry and methods for testing an asynchronous arbiter that utilizes mutual-exclusion ("ME") elements.

BACKGROUND ART

An arbiter is an interface circuit that controls an electronic communication protocol by assigning priorities to a group of input signals, referred to here as request signals or sometimes just requests, in order to establish a sequence by which the signals are further processed. The priority assignment is typically based on temporal aspects of the request signals, such as the order in which they are asserted at the arbiter's inputs. When the temporal aspects of certain of the request signals are so similar as to exceed the resolution capability of the arbiter, the priority assignment is usually completed by making one or more arbitrary selections and/or following a predetermined coding.

Referring to FIG. 1, it illustrates a conventional four-input asynchronous arbiter such as that described in U.S. Pat. No. 4,835,422. This arbiter is formed with a mutual-exclusion array 10 and a conflict-resolving decoder 12 that together determine which of input request signals $R_1-R_4$ (collectively the "R" signals) is to be granted "absolute" priority over all the other R signals for the purposes of further signal processing. The absolute priority determination is based principally on the order in which the R signals are asserted at the arbiter's inputs.

The arbiter in FIG. 1 produces an absolute priority output grant signal G indicative of the absolute priority grant. Absolute priority signal G is a four-bit signal consisting of bits $G_1-G_4$ (collectively the "G" bits). Letting i be an integer running from 1 to the number of the last R signal (i.e., 4 here), the value of bit $G_i$ specifically indicates whether request $R_i$ has been granted absolute priority.

ME array 10 contains six substantially identical two-input ME elements $10_1-10_6$ that operate on the R signals to produce six intermediate priority signals $I_1-I_6$ (collectively the "I" signals). In particular, each ME element $10_j$, where j is an integer running from 1 to the number of the last ME element (i.e., 6 here), receives a different pair of the R signals. Because there are six different pairs of R signals, array 10 thereby covers all the possible pairs of R signals.

Each ME element $10_j$ operates on its pair of R signals to determine which of the two is to be granted "pairwise" priority over the other when at least one of the two is asserted. ME element $10_j$ then produces its intermediate priority signal $I_j$ at a value indicative of the pairwise priority determination. Each signal $I_j$ is a two-bit signal consisting of bits $I_{jA}$ and $I_{jB}$. One of bits $I_{jA}$ and $I_{jB}$ is used to indicate that one of the pair of R signals to element $10_j$ has gained pairwise priority between the two signals, while the other of bits $I_{jA}$ and $I_{jB}$ serves to indicate that the other R signal has received pairwise priority.

Decoder 12 is formed with suitable logic that decodes the I signals to produce the G bits. In performing the decoding, decoder 12 also resolves priority conflicts that occur when certain of the R signals are asserted so close in time that ME array 10 is unable to supply the I signals at values that uniquely indicate the order in which the R signals were asserted.

For example, consider the pairwise priority determinations involving request signals $R_1-R_3$. Assume that they are all asserted and that request $R_4$ is not asserted. As shown in FIG. 1, ME element $10_1$ operates on signal pair $R_1$ and $R_2$, ME element $10_2$ operates on signal pair $R_1$ and $R_3$, and ME element $10_4$ operates on signal pair $R_2$ and $R_3$. Letting the slash symbol ("/") mean "has beaten" (i.e., "has gained pairwise priority over"), further assume that elements $10_1$, $10_4$, and $10_2$ supply signals $I_1$, $I_4$, and $I_2$ at values respectively indicating that $R_1/R_2$, $R_2/R_3$, and $R_3/R_1$. This constitutes a priority conflict since none of requests $R_1-R_3$ is a clear winner over the other two. The logic circuitry in decoder 12 resolves this conflict in a predetermined manner and then supplies grant signal G at an unambiguous value indicating that one of requests $R_1-R_3$ is the absolute priority winner.

Note that a "priority" conflict here means a conflict that directly affects the absolute priority determination. Consequently, a priority conflict arises among a specific group of R signals only if those particular signals are true contenders for the absolute priority grant. For instance, in the preceding example, assume that request $R_4$ is also asserted and that it beats all of requests $R_1-R_3$ to get the absolute grant. Even though the I signals still indicate that $R_1/R_2$, $R_2/R_3$, and $R_3/R_1$, there is no priority conflict among requests $R_1-R_3$ since none of them can be the absolute priority winner.

The signal path for all priority determinations, regardless of whether priority conflicts need to be resolved or not, goes fully through decode logic 12. The great majority of this logic is utilized solely for handling priority conflicts. However, priority conflicts are normally rare events. For priority determinations that do not require priority-conflict resolution, it is disadvantageous to impose the signal propagation delay through the conflict-resolving logic on the signal propagation delay through the rest of the arbiter.

Even though priority conflicts are relatively rare, a manufacturer or user of an arbiter based on pairwise mutual exclusion would generally like to verify that priority conflicts are resolved according to the format prescribed for the arbiter. The difficulty with doing so is that the requests usually cannot be asserted in such a manner that a given priority conflict is reliably generated. Consequently, a technique for testing the conflict-resolution capability would be quite helpful, especially if the arbiter is designed in a way that significantly avoids having the conflict-resolving propagation delay imposed on the rest of the signal propagation delay for absolute priority determinations not involving conflict resolution.

GENERAL DISCLOSURE OF THE INVENTION

The present invention furnishes such a test technique in a circuitry aspect and in a test method aspect. In both aspects, the invention centers around an arbiter that generates an absolute priority signal indicating that one of three or more request signals has gained absolute priority over all the other request signals. The arbiter contains an array of three or more mutual-exclusion elements, each of which is generally responsive to a different pair of the requests for producing an intermediate priority signal at a value indicating that one of that pair of requests has gained pairwise priority between the two requests. Priority conflicts among the requests are internally indicated by the intermediate priority signals.

In the circuitry aspect, at least one of the ME elements is designed to be responsive to one or more externally originated test signals that, when suitably asserted, cause that ME element to reverse its pairwise priority determination. That is, the ME element produces its intermediate priority signal at a value indicating that the other request of the pair of requests supplied to that ME element has gained pairwise priority between the two requests. By suitably asserting the requests (in the manner described below), a priority conflict can be simulated to test the arbiter.

The arbiter also contains a circuit for resolving priority conflicts and decoding the intermediate priority signals to produce the absolute priority signal. This resolving/decoding circuit preferably generates one or more control signals and selectively asserts them upon determining that a priority conflict exists among the requests. At least one of the ME elements is responsive to at least one such control signal, when asserted due to a priority conflict, for causing that ME element to reverse its pairwise priority determination. Because the ME array is controlled in this way, the signal path for absolute priority determinations does not have to pass through the conflict-resolving portion of the resolving/decoding circuit when there is no priority conflict. The average signal propagation delay through the arbiter is considerably less than that in an otherwise comparable prior art arbiter of the type mentioned above.

The arbiter's ability to resolve priority conflicts is checked by operating the arbiter according to the test aspect of the invention. A conflict-resolution test is initiated by asserting at least two, and typically at least three, of the requests in a way that (clearly) avoids a priority conflict. For example, the requests can be asserted at times which are sufficiently spaced apart that the arbiter can make a unique absolute priority determination without utilizing the conflict-resolution capability of the resolving/decoding circuit. After the ME elements suitably provide their pairwise priority determinations, a selected one of the ME elements (i.e., the ME element that has the above-mentioned test feature) is then forced to reverse its pairwise priority determination such that the intermediate priority signals now indicate that a priority conflict appears to exist. The arbiter is monitored to determine whether the resolving/decoding circuit resolves the apparent priority conflict in a way that would be expected for that conflict had it been a real one.

The present test technique is relatively simple. It requires only a small amount of additional circuitry for verifying that the arbiter resolves priority conflicts in the intended way. Also, when the test technique is employed with an arbiter that is designed in the way described above so as to avoid having the signal path go through the conflict-resolving circuitry when there is no priority conflict, the ME elements that respond to the control signals can be configured in the same way as the ME elements that respond to the test signals. This makes it easy to manufacture the arbiter.

BRIEF DESCRIPTION OF THE DRAWINGS

Like reference symbols are employed in the drawings and in the description of the preferred embodiments to represent the same or very similar item or items.

Figure 1:
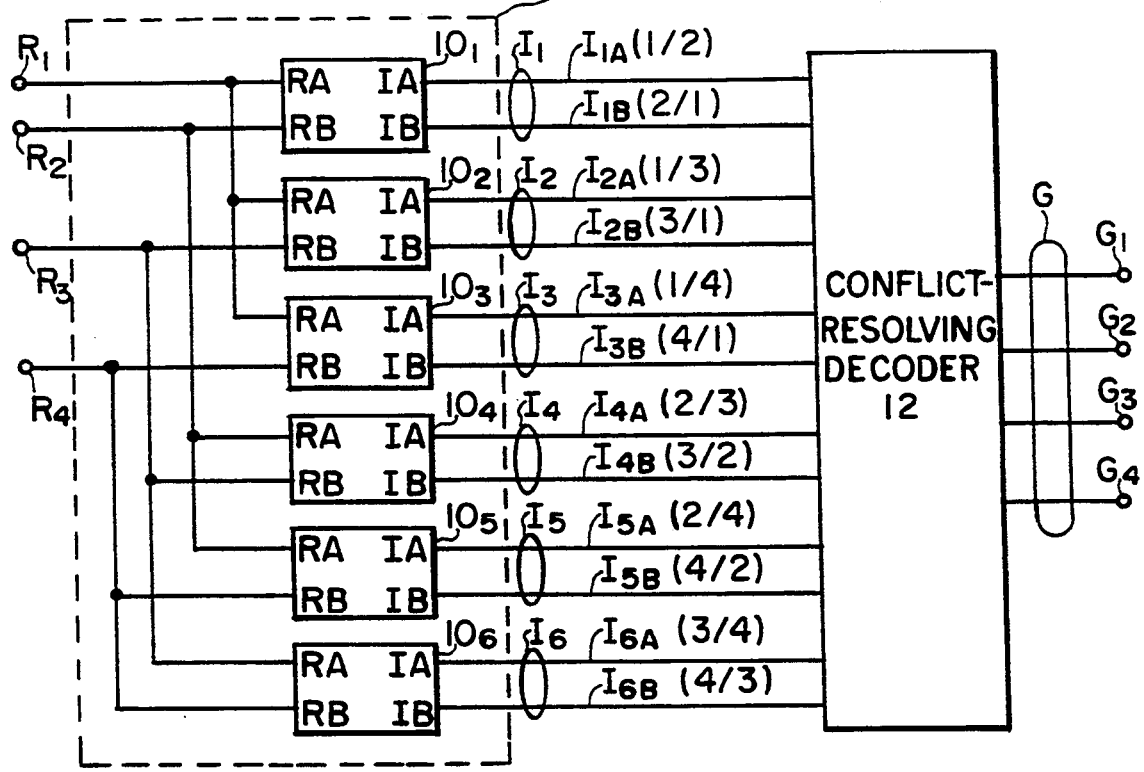
FIG. 1 is a block diagram of an asynchronous prior art arbiter.
Figure 2:
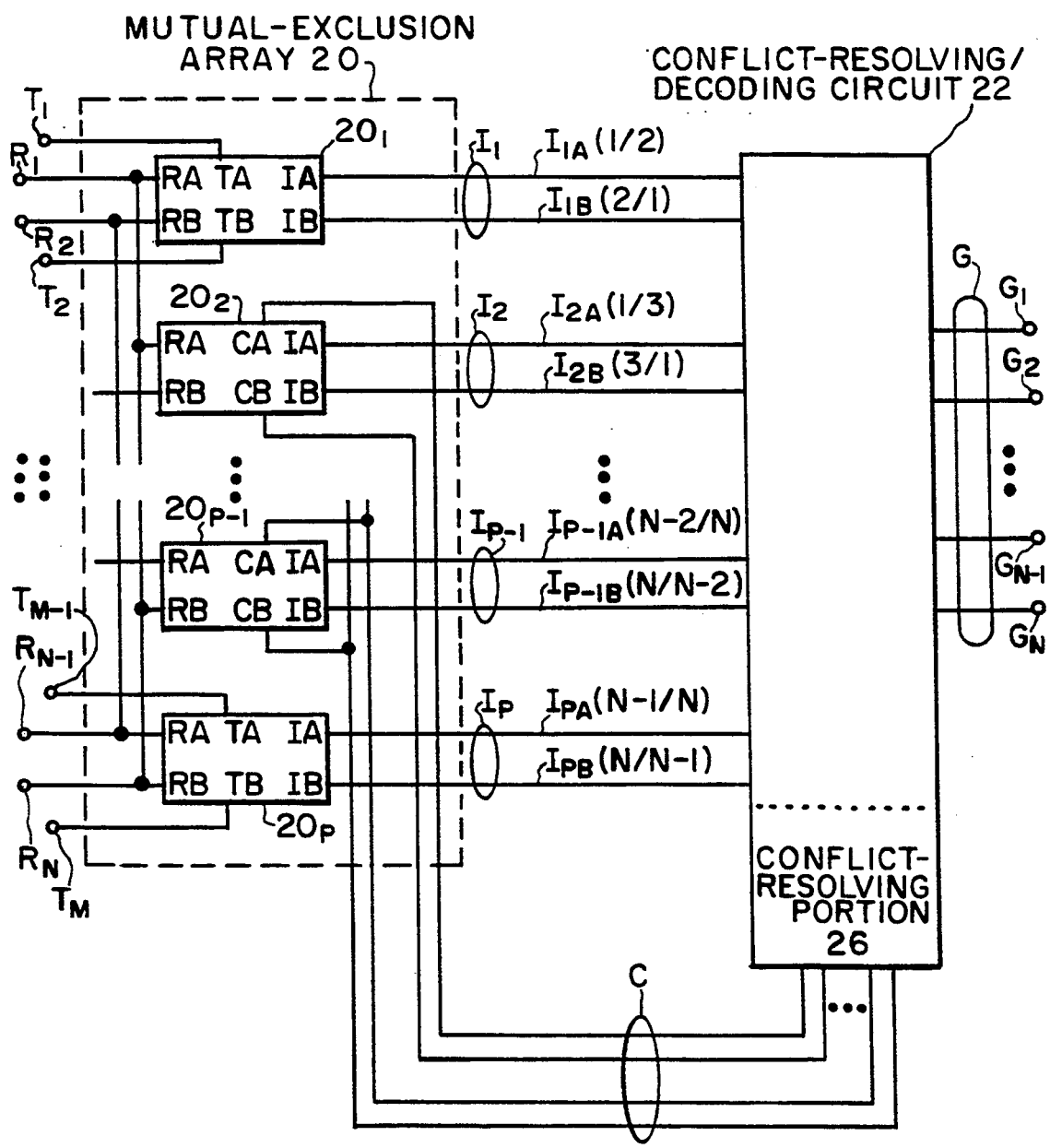
FIG. 2 is a general block diagram of an asynchronous arbiter that can be tested according to the invention.
Figure 3:
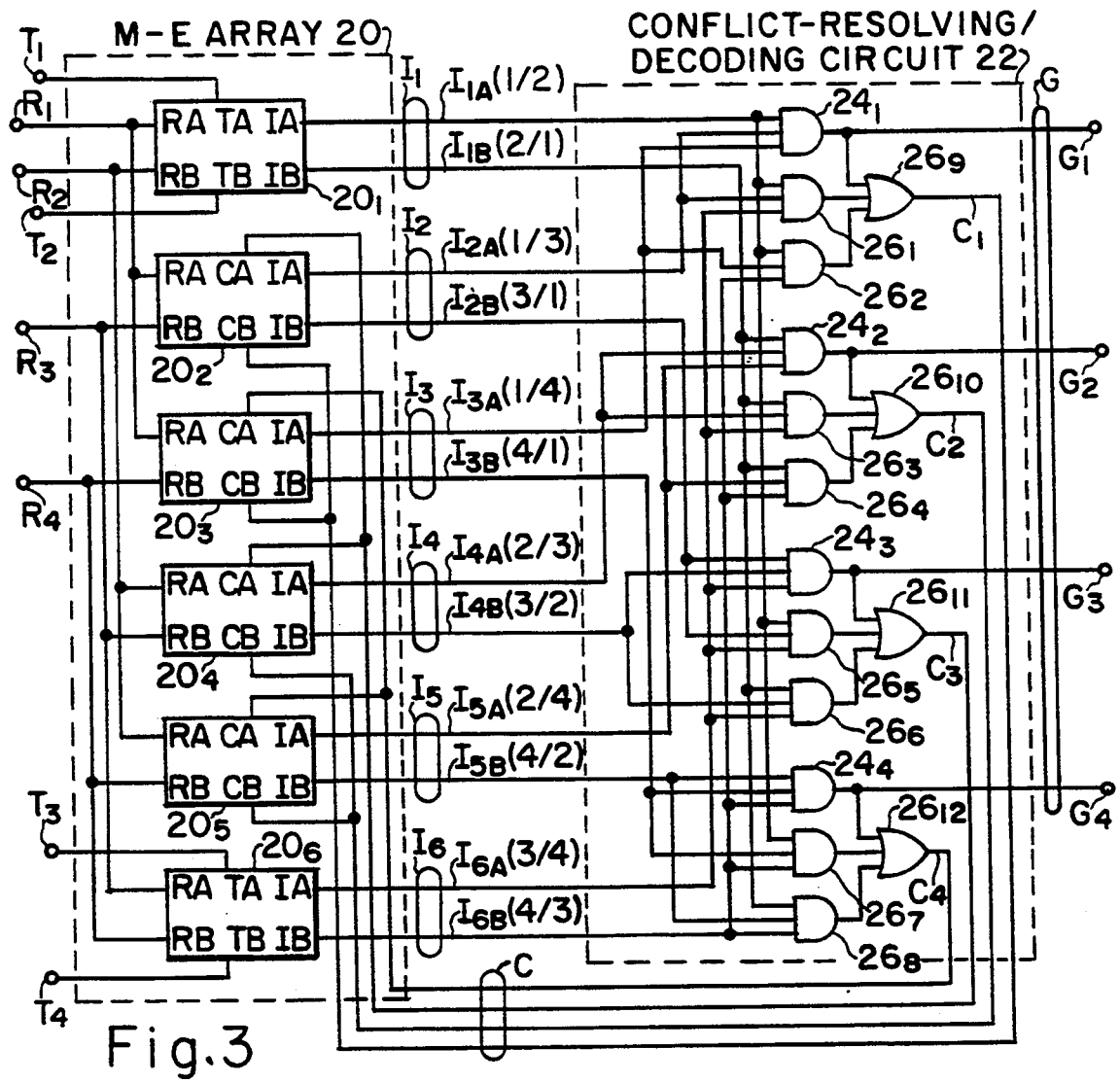
FIG. 3 is a block diagram of an embodiment of the arbiter of FIG. 2.

The parenthetical numbers to the right of the $I_{jA}$ and $I_{jB}$ bits in FIGS. 1-3 indicate which of each pair of R signals has gained pairwise priority over the other R signal when at least one of them is asserted. The slash between each pair of parenthetical numbers means "has beaten". Thus, the parenthetical notation "$\frac{1}{2}$" to the right of bit $I_{1A}$ indicates that $R_1$ has beaten $R_2$. Similarly, the parenthetical notation "2/1" to the right of bit $I_{1B}$ means that $R_2$ has beaten $R_1$.

Figure 4:
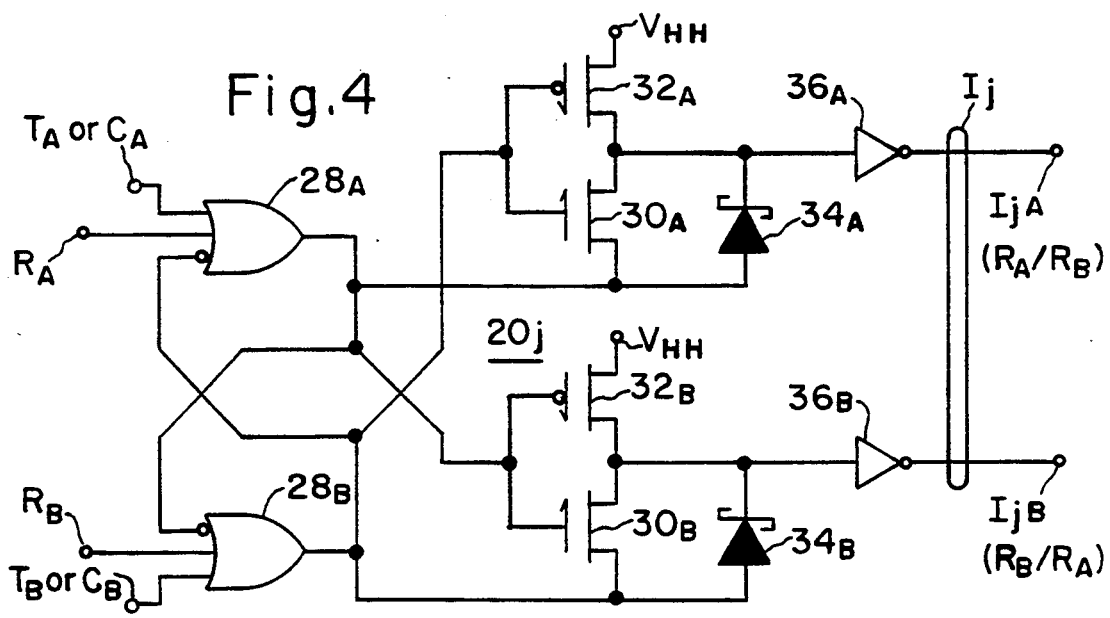
FIG. 4 is a circuit diagram of an embodiment of an ME element suitable for the arbiter of FIG. 3.

Each field-effect transistor ("FET") in FIG. 4 has a first flow electrode (or source), a second flow electrode (or drain), and a control electrode (or gate electrode) that controls current flow between the two flow electrodes. The half-arrowhead on the control electrode of each FET is directed towards its second flow electrode.

DESCRIPTION OF THE PREFERRED EMBODIMENTS

FIG. 2 shows a general architecture for an N-input asynchronous arbiter that utilizes pairwise mutual exclusion adapted for testing according to the invention. N, the number of input request signals $R_1, R_2, \ldots R_N$ (collectively the "R" signals), is 3 or more. The arbiter in FIG. 2 contains a mutual-exclusion array 20 and a conflict-resolving/decoding circuit 22 that operate on the R signals to determine which, if any, of them is to be granted absolute priority over all the other R signals.

As in FIG. 1, absolute priority output grant signal G is supplied from the arbiter at a value indicative of the absolute priority grant. Grant signal G here consists of N bits $G_1, G_2, \ldots G_N$ (collectively the "G" bits). Each bit $G_i$ is specifically associated with request $R_i$.

Turning to the details of the arbiter architecture, ME array 20 is formed with P two-input mutual-exclusion elements $20_1, 20_2, \ldots 20_P$ that respectively generate P intermediate priority signals $I_1, I_2, \ldots I_P$ (collectively the "I" signals) in response to the R signals. In particular, a different pair of the R signals are respectively supplied to input terminals RA and RB of each ME element $20_j$. Each element $20_j$ then determines which, if either, of that pair of R signals is to be granted pairwise priority over the other and furnishes its intermediate priority signal $I_j$ at a value indicative of the pairwise priority determination. Unless overridden in the manner discussed below, the pairwise priority grant goes to the R signal that is first asserted at element $20_j$. If both R signals are asserted at the same time within the resolution capability of element $20_j$, it makes an arbitrary pairwise priority determination.

As with the arbiter of FIG. 1, each intermediate priority signal $I_j$ consists of bits $I_{jA}$ and $I_{jB}$ respectively supplied from output terminals IA and IB of ME element $20_j$. Bit $I_{jA}$ serves to indicate that one of the R signals to element $20_j$ has gained pairwise priority. Likewise, bit $I_{jB}$ is utilized to indicate that the other R signal has gained pairwise priority.

P, the number of ME elements, normally equals $N(N-1)/2$. Accordingly, there is one ME element for each different pair of R signals.

M externally originated test signals $T_1, T_2, \ldots T_M$ (collectively the "T" signals) are provided to certain of ME elements $20_1$–$20_p$ for use in determining whether the conflict-resolving circuitry in circuit 22 functions correctly- Each such circuit-testing ME element $20_j$ is referred to as a "prime-pair" ME element.

There usually are $N/2$ prime-pair ME elements when N is an even number. Using the (arbitrary) numbering convention employed in FIG. 2, the prime-pair ME elements in the "even-N" case preferably consist of all the ME elements that respond to pairs of different consecutively-numbered R signals starting with $R_1$ and ending with $R_N$. Thus, the prime-pair ME elements in FIG. 2 consists of ME element $20_1$ that receives pair $R_1$ and $R_2$, the (unshown) ME element that receives pair $R_3$ and $R_4$, and so on up through ME element $20_P$ that receives pair $R_{N-1}$ and $R_N$ to the extent there is no duplication.

Each prime-pair ME element receives a pair of the T signals at respective test terminals TA and TB. The two T signals for prime-pair ME element $20_j$ are respectively referred to here as test signals "$T_A$" and "$T_B$" without any subscript numbering. In general, signals $T_A$ and $T_B$ for one prime-pair ME element differ from those for another prime-pair ME element. When prime-pair ME element $20_j$ supplies the pairwise priority determination indicated by bit $I_{jA}$, assertion of signal $T_A$ for element $20_j$ causes it to reverse its pairwise priority determination and to subsequently furnish the pairwise priority determination indicated by bit $I_{jB}$. Likewise, when prime-pair element $20_j$ furnishes the priority determination indicated by bit $I_{jB}$, asserting signal $T_B$ forces element $20_j$ to reverse its priority determination and thereafter to provide the priority determination indicated by bit $I_{jA}$.

For example, assume that ME element $20_1$ supplies bit $I_{1A}$ at a value indicating that $R_1$ has beaten $R_2$. Asserting signal $T_1$, which is the "$T_A$" signal for element $20_1$, causes it to reverse the priority determination represented by bit $I_{1A}$. That is, bit $I_{1A}$ now goes to a value indicating that $R_2$ has beaten $R_1$, while bit $I_{1A}$ goes to a value which does not indicate that $R_1$ has beaten $R_2$.

Conflict-resolving/decoding circuit 22 consists of a decoding portion 24 and a conflict-resolving portion 26. Decoding portion 24 is formed with a group of logic gates that decode the I signals to produce absolute priority signal G. Conflict-resolving portion 26 is formed with a (more complex) group of logic gates that resolve priority conflicts among the R signals. To do so, portion 26 supplies a control signal C to ME array 20. Control signal C consists of K bits (collectively the "C" signals). For reasons of economy, portion 26 may use part or all of the decode logic of portion 24 in performing the conflict resolution. The end result is that portion 26 generates control signal C in response to the I signals and possibly in response to part or all of the G bits.

The C signals are supplied in pairs to certain of ME elements $20_1$–$20_P$ for controlling ME array 20 during priority-conflict resolutions. Each ME element $20_j$ that receives a pair of the C signals is referred to as a "conflict-elimination" ME element. Normally, each conflict-elimination ME element $20_j$ responds to a different pair of C signals. Also, each conflict-elimination ME element usually is not a prime-pair ME element. This is the situation illustrated in FIG. 2. In fact, the conflict-elimination ME elements preferably consist of all the ME elements that are not prime-pair ME elements.

Each conflict-elimination ME element $20_j$ has a pair of control terminals CA and CB that respectively receive its pair of C signals. These two signals are respectively referred to here as control signals "$C_A$" and "$C_B$" without using any subscript numbering.

A conflict-elimination ME element is controlled by its control signals $C_A$ and $C_B$ in the same way that a prime-pair ME element is controlled by its test signals $T_A$ and $T_B$. When conflict-elimination ME element $20_j$ supplies the pairwise priority determination indicated by bit $I_{jA}$, asserting control signal $C_A$ for element $20_j$ causes it to reverse its pairwise priority determination and thereafter to supply the pairwise priority determination indicated by bit $I_{jB}$. Similarly, when conflict-elimination ME element $20_j$ furnishes the priority assignment indicated by bit $I_{jB}$, asserting control signal $C_B$ for element $20_j$ causes it to reverse its priority assignment and to subsequently furnish the priority assignment indicated by bit $I_{jA}$.

Each conflict-elimination ME element $20_j$ could be implemented with a pair of input "transfer" elements, such as AND or OR gates (depending on polarity), and a "basic" ME element, such as ME element $10_j$ in FIG. 1. Signal $C_A$ and one of the R signals for element $20_j$ would be supplied as inputs to one of the transfer elements. Signal $C_B$ and the other R signal for element $20_j$ would be furnished as inputs to the other transfer element. The output signals of the transfer elements would be supplied as inputs to the basic ME element. When a priority conflict is not being resolved, signals $C_A$ and $C_B$ would be furnished at values that enable the two output signals of the transfer elements to be at the same respective values as the input R signals. In other words, the transfer elements would be transparent to the pair of R signals when there is no priority conflict.

Likewise, each prime-pair ME element $20_j$ could be implemented in the same way with a pair of input "transfer" elements and a "basic" ME element. Test signals $T_A$ and $T_B$ would simply take the place of control signals $C_A$ and $C_B$. When the arbiter is not being tested, the transfer elements would be made transparent to the pair of input R signals by providing signals $T_A$ and $T_B$ at values that enable the output signals of the transfer elements to be at the same values as the input R signals.

Inasmuch as the conflict-elimination ME elements function in the same way as the prime-pair ME elements, both groups of ME elements can be internally implemented in the same way. This facilitates layout of the arbiter when it is fabricated in semiconductor integrated-circuit form.

To understand how the arbiter of FIG. 2 operates, it is helpful to state precisely what is meant by "asserting" a signal. All of the above-mentioned signals for the arbiter switch between a high logic level and a low logic level. One of these levels represents the asserted (or active) condition, while the other represents the non-asserted (or inactive) condition. Asserting one of these signals then means to change its value from the non-asserted logic level to their asserted logic level.

With the foregoing in mind, the arbiter of FIG. 2 operates in the following way during a normal absolute priority determination. Each of the T signals is held in its non-asserted condition during the priority determination. For all of the T signals, this is usually either a high logic level or a low logic level depending on which is their non-asserted state.

Each of the R signals is initially in a non-asserted condition. Accordingly, the R signals usually all start out at a high logic level or a low logic level depending on which is their non-asserted level. The I signals are initially at values which indicate the absence of any pairwise priority determinations. This is another way of saying that each of bits $I_{1A}$–$I_{PA}$ and $I_{1B}$–$I_{PB}$ is initially in a non-asserted condition. They all usually start out at the same logic level, high or low, depending on which level represents their non-asserted condition.

Each of the C signals is initially in a non-asserted condition. Because the conflict-elimination ME elements function in the same way as prime-pair ME elements, the C signals usually all start out at a high logic level if that is the non-asserted level for the T signals or at a low logic level if that is the non-asserted level for the T signals. Absolute priority signal G initially indicates that none of the R signals has absolute priority. Consequently, the G bits usually all start out at the same logic level, high or low, depending on which level indicates the absence of an absolute priority determination.

One or more of the R signals is now asserted. ME array 20 makes appropriate pairwise priority determinations and causes certain of bits $I_{1A}$–$I_{PA}$ and $I_{1B}$–$I_{PB}$ to be asserted. The values of these bits indicate whether there is a priority conflict among the R signals. If there is no priority conflict, decoding portion 24 supplies grant G at a value indicating that one of the R signals has absolute priority over all the others. In particular, the bit $G_i$ corresponding to the request $R_i$ that received the absolute priority grant goes from its initial logic level to the opposite logic level, while the remainder of the G bits remain at their initial logic levels.

If the values of the I signals indicate that there is a priority conflict, conflict-resolving portion 26 causes certain of the C signals to be asserted depending on which R signals are involved in the conflict and the nature of the conflict. In response, ME array 20 reverses the values of certain of bits $I_{1A}$–$I_{PA}$ and $I_{1B}$–$I_{PB}$ in such a way that the I signals no longer indicate a priority conflict. As is evident from FIG. 2, only the values of those I signals supplied from conflict-elimination ME elements are so adjusted. Decoding portion 24 then supplies grant 6 at a value indicating that one of the R signals has gained absolute priority. Circuit 22 is designed to produce a unique absolute priority assignment for each different priority conflict.

Of the two C signals supplied to each conflict-elimination ME element whose pairwise priority determination needs to be reversed to eliminate a priority conflict, conflict-resolving portion 26 normally asserts only the particular C signal needed to cause the reversal. For example, if ME element $20_2$ supplies the pairwise priority assignment indicated by bit $I_{2A}$ and if that assignment needs reversal, portion 26 asserts signal $C_A$ for element $20_j$ but not signal $C_B$.

Conflict-resolving portion 26 typically also asserts certain C signals that go to conflict-elimination ME elements whose pairwise priority determinations need to stay the same. Of the two C signal furnished to each such ME element, portion 26 asserts, at most, only the C signal opposite to the one needed to cause that conflict-elimination ME element to reverse its then-existent priority determination. Thus, if ME element $20_2$ provides the pairwise priority assignment indicated by bit $I_{2A}$ and if that assignment must stay the same, signal $C_B$ may be asserted for element $20_2$ but not signal $C_A$.

As the above discussion indicates, resolution of a priority conflict involves going through circuit 22 twice, once in resolving the conflict and then a second time in furnishing grant G at the proper decoded value. However, only one pass through circuit 22 occurs when there is no priority conflict. Importantly, the nonconflict signal path through circuit 22 extends through decoding portion 24 and does not actively involve conflict-resolving portion 26.

Decoding portion 24 is typically formed with at least one less level of logic than the conflict-resolving decoder of an otherwise comparable prior art arbiter such as that disclosed in U.S. Pat. No. 4,835,422 cited above. For example, decoding portion 24 usually consists of one logic level when the present arbiter is a four-input device (see FIG. 3 discussed below), whereas decoder 12 of the four-input device of U.S. Pat. No. 4,835,422 employs two logic levels. As noted above, the signal path for the prior art arbiter extends through all the decode logic levels regardless of whether there is a priority conflict or not. When there is no priority conflict, the signal propagation delay through the present arbiter is thus considerably less than that through an otherwise comparable prior art arbiter. Since priority conflicts are infrequent events, the present arbiter operates considerably faster on the average.

To test the conflict-resolution capability of the present arbiter, a number of individual tests are performed to evaluate different parts of circuit 22. For each test, the initial conditions are usually the same as those given above for a normal absolute priority determination.

An individual test is initiated by asserting at least two R signals at times sufficiently spaced apart as to clearly avoid a priority conflict. At least one of the asserted R signals must go to a prime-pair ME element. Normally, three R signals must be asserted, and two of them must go to the same prime-pair ME element In response to the asserted R signals, ME array 20 makes appropriate pairwise priority assignments and suitably asserts certain I signals. Grant G is thereby supplied at a value indicating that one of the asserted R signals has gained absolute priority.

A selected T signal is now asserted. The asserted T signal is one which (a) goes to a prime-pair ME element $20_j$ that furnishes signal $I_j$ at a value actively indicating a pairwise priority determination and (b) causes that element $20_j$ to reverse its pairwise priority determination such that a priority conflict now appears to exist among the R signals. The arbiter now undertakes to resolve the apparent priority conflict.

The arbiter is monitored during the conflict-resolution test to determine whether conflict-resolving portion 26 resolves the apparent priority conflict in the way expected for that conflict had it been a real one. This typically involves observing absolute priority signal G to see if it changes in a specified manner after assertion of the selected T signal. Nonetheless, other signal nodes in the arbiter can be accessed to evaluate the arbiter's conflict-resolution capability.

FIG. 3 illustrates a four-input embodiment of the arbiter of FIG. 2. M (the number of T signals) and K (the number of C signals) both equal N (the number of R signals)—i.e., 4—in the embodiment of FIG. 3. P (the number of ME elements) is 6. Element $20_1$ and $20_6$ are prime-pair ME elements. Elements $20_2$–$20_5$ are conflict-elimination ME elements.

Decoding portion 24 in FIG. 3 consists of four three-input AND gates $24_1$–$24_4$ arranged as shown to produce four G bits $G_1$–$G_4$. Conflict-resolving portion 26 is formed with eight three-input AND gates $26_1$–$26_8$ and four three-input OR gates $26_9$–$26_{12}$ all arranged as shown to produce four C signals $C_1$–$C_4$. Bits $G_1$–$G_4$ are respectively supplied to OR gates $26_9$–$26_{12}$ to help in conflict resolutions. In fact, gates $24_1$–$24_4$ and $26_1$–$26_{12}$ perform the same logic function as that done by the conflict-resolving decode logic in U.S. Pat. No. 4,835,422 except that it achieves output polarity inversion by using NOR gates in place of OR gates $26_9$–$26_{12}$.

The R signals in the embodiment of FIG. 3 are non-asserted (inactive) when they are logically high. Each of the R signals is asserted (active) when it goes logically low. Conversely, the T and C signals are non-asserted when they are logically low and asserted when they are logically high. When ME element $20_j$ supplies bit $I_{jA}$ or $I_{jB}$ at a logically high level, element $20_j$ has made the priority assignment indicated to the right of that bit in FIG. 3. The indicated priority assignment has not been made when bit $I_{jA}$ or $I_{jB}$ is logically low. No absolute priority assignment has been made when the G bits are all logically low. When a single bit $G_i$ goes logically high while the other G bits remain logically low, grant indicates that request $R_i$ has gained absolute priority.

Each of the C signals goes to two different conflict-elimination ME elements. When one or more of the R signals are asserted, gates $26_1$–$26_{12}$ and $24_1$–$24_4$ operate to assert exactly one C signal regardless of whether a priority conflict occurs or not. If there is no priority conflict, the asserted C signal is the one having the same subscript number as the R signal first asserted due to coding used in the arbiter, no changes occur in the pairwise priority grants made by the two conflict-elimination ME elements that receive the asserted C signal. If there is a priority conflict, the asserted C signal causes one of the two recipient conflict-elimination ME elements to reverse its priority assignment To perform a complete test on the conflict-resolution capability of circuit 22 in FIG. 3, eight individual test sequences are generally needed to check different parts of the logic circuitry as output G is monitored. In each of the eight test sequences, three of the R signals are sequentially asserted with time spacings great enough to get a clear absolute priority grant. The first and third R signals are inputs to one of the prime-pair ME elements. The pairwise priority determination of this prime-pair ME element is then reversed by asserting the appropriate T signal in order to create an apparent priority conflict for checking a specific part or circuit 22. The remaining R signal, although normally not asserted since it is unnecessary to do so, is nonetheless involved in a pairwise priority determination pertinent to the logic portion being checked.

Let grant G be represented as ($G_1G_2G_3G_4$), where a "1" is a logical high and a "0" is a logical low. Letting a slash again denote "has beaten", the eight test sequences are:
1. Sequentially assert $R_4$ $R_1$, and $R_3$ and then assert $T_4$ to reverse the $R_4/R_3$ priority determination (made by ME element $20_6$) and get the apparent conflict $R_4/R_1$, $R_1/R_3$, and $R_3/R_4$. Since $R_1/R_2$ also arises (here), this sequence is sufficient to check (the signal paths) through gate $26_1$. G should switch from (0001) to (1000).
2. Sequentially assert $R_3$, $R_1$, and $R_4$ and then assert $T_3$ to reverse the $R_3/R_4$ priority determination and get the apparent conflict $R_3/R_1$, $R_1/R_4$, and $R_4/R_3$. Since $R_1/R_2$ also arises, this sequence is sufficient to check gate $26_2$. G should switch from (0010) to (1000).
3. Sequentially assert $R_4$, $R_2$, and $R_3$ and then assert $T_4$ to reverse the $R_4/R_3$ priority determination and get the apparent conflict $R_4/R_2$, $R_2/R_3$, and $R_3/R_4$. Since $R_2/R_1$ also arises, this sequence is sufficient to check gate $26_3$. G should switch from (0001) to (0100).
4. Sequentially assert $R_3$, $R_2$, and $R_4$ and then assert $T_3$ to reverse the $R_3/R_4$ priority determination and get the apparent conflict $R_3/R_2$, $R_2/R_4$, and $R_4/R_3$. Since $R_2/R_1$ also arises, this sequence is sufficient to check gate $26_4$. G should switch from (0010) to (0100).
5. Sequentially assert $R_2$, $R_3$, and $R_1$ and then assert $T_2$ to reverse the $R_2/R_1$ priority determination (made by ME element $20_1$) and get the apparent conflict $R_2/R_3$, $R_3/R_1$, and $R_1/R_2$. Since $R_3/R_4$ also arises, this sequence is sufficient to check gate $26_5$. G should switch from (0100) to (0010).
6. Sequentially assert $R_1$, $R_3$, and $R_2$ and then assert $T_1$ to reverse the $R_1/R_2$ priority determination and get the apparent conflict $R_1/R_3$, $R_3/R_2$, and $R_2/R_1$. Since $R_3/R_4$ also arises, this sequence is sufficient to check gate $26_6$. G should switch from (1000) to (0010).
7. Sequentially assert $R_2$, $R_4$, and $R_1$ and then assert $T_2$ to reverse the $R_2/R_1$ priority determination and get the apparent conflict $R_2/R_4$, $R_4/R_1$, and $R_1/R_2$. Since $R_4/R_3$ also arises, this sequence is sufficient to check gate $26_7$. G should switch from (0100) to (0001).
8. Sequentially assert $R_1$, $R_4$, and $R_2$ and then assert $T_1$ to reverse the $R_1/R_2$ priority determination and get the apparent conflict $R_1/R_4$, $R_4/R_2$, and $R_2/R_1$. Since $R_4/R_3$ also arises, this sequence is sufficient to check gate $26_8$. G should switch from (1000) to (0001).

In the preceding way, the eight test sequences check gates $26_1$–$26_8$.

Next consider gates $24_1$–$24_4$. Each gate $24_i$ is checked by simply first asserting request $R_i$ to determine if bit $G_i$ goes from "0" to a "1". For each gate $G_i$, this $R_i$ assertion occurs in two of the test sequences prior to asserting signal $T_i$. The eight sequences are therefore also sufficient to test gates $24_1$–$24_4$.

Finally, gates $26_9$–$26_{12}$ are tested when all of their input signals are individually asserted. This occurs during the eight test sequences. As a result, the eight sequences are sufficient to test all of circuit 22.

The principles of the present invention apply to the situation in which the number of arbiter request inputs is only three. In that case, the arbiter conflict-resolution test sequences can normally be performed by asserting only two of the three requests during each sequence.

The present test technique is particularly useful when the number of arbiter request inputs is greater than four. Although a complete program for testing the conflict-resolving capability has only been given for the four-input case, based on what has been said about testing the general architecture of FIG. 2 and the four-input device of FIG. 3, it should be clear how to test the conflict-resolution capability of an arbiter which utilizes pairwise mutual exclusion in responding to more than four request inputs.

M (the number of T signals) usually equals N (the number of R signals) when N is even and greater than 4. For even-N greater than 4, each conflict-resolution test sequence can typically be performed by asserting only three of the more-than-four requests.

Each of ME elements $20_1$–$20_6$ in FIG. 3 preferably has the same internal configuration. Turning to FIG. 4 it depicts a preferred embodiment for any ME element $20J$ in FIG. 3. Element $20_j$ in FIG. 4 consists of cross-coupled three-input OR gates $28_A$ and $28_B$, N-channel enhancement-mode insulated-gate FETs $30_A$ and $30_B$, P-channel enhancement-mode insulated-gate FETs $32_A$ and $32_B$, rectifying elements $34_A$ and $34_B$, and output inverters $36_A$ and $36_B$, all connected as shown. Rectifying elements $34_A$ and $34_B$ are diodes preferably Schottky diodes. The output signal of each gate $28_A$ or $28_B$ is supplied as an inverted input to the other gate $28_B$ or $28_A$ to set up a latching arrangement. Item $V_{HH}$ is a high supply voltage.

ME element $20_j$ in FIG. 4 operates as follows. A high logical level corresponds to a high voltage, while a low logical level corresponds to a low voltage. Consider the case in which element $20_j$ is a prime-pair ME element controlled by test signals $T_A$ and $T_B$.

Signals $R_A$, $R_B$, $T_A$, and $T_B$ are initially all in their non-asserted conditions. That is, signals $R_A$ and $R_B$ start out at high voltages, while signals $T_A$ and $T_B$ start out at low voltages. Under these conditions, the output signals of gates $28_A$ and $28_B$ are both at high voltages. FETs $30_A$, $30_B$, $32_A$, and $32_B$ thereby are initially all turned off. Rectifying elements $34_A$ and $34_B$ are initially turned on. The forward voltages of rectifying elements $34_A$ and $34_B$ are sufficiently low that they pull the inputs of inverters $36_A$ and $36_B$ up to high voltages. Consequently, signals $I_{jA}$ and $I_{jB}$ are both at low voltages indicating that element $20_j$ has made no pairwise priority assignment.

Assume that request $R_A$ is asserted by dropping it to a low voltage to initiate a pairwise priority determination. The output signal of gate $28_A$ drops to a low voltage while the output signal of gate $28_B$ remains at its high voltage. FET $30_A$ turns on and pulls the input of inverter $36_A$ to a low voltage. Signal $I_{jA}$ goes to a high voltage indicating the pairwise priority grant $R_A/R_B$. FET $32_B$ turns on and maintains the input of inverter $36_B$ at a high voltage. Signal $I_{jB}$ thereby remains at a low voltage.

If request $R_B$ is subsequently asserted by going to a low voltage at a time sufficiently later that ME element $20_j$ can recognize that signal $R_A$ went low first, the low output signal from gate $28_A$ causes gate $28_B$ to continue providing its output signal at a high voltage. No changes occur in element $20_j$. Signals $I_{jA}$ and $I_{jB}$ still indicate $R_A/R_B$.

When request $R_B$ is asserted first, ME element $20_j$ operates in the complementary way to that just described. Signals $I_{jA}$ and $I_{jB}$ now indicate $R_B/R_A$, If both of requests $R_A$ and $R_B$ are asserted at substantially the same time within the resolution capability of ME element $20_j$, it goes into a metastable condition and makes an arbitrary pairwise priority determination. During the metastability period, cross-coupled FETs $30_A$ and $30_B$ prevent each of signals $I_{jA}$ and $I_{jB}$ from prematurely going to a high voltage. When the metastable condition is resolved, either FETs $30_A$ and $32_B$ turn on or FETs $30_B$ and $32_A$ turn on. Consequently, one of signals $I_{jA}$ and $I_{jB}$ goes high while the other remains low.

If one of requests $R_A$ and $R_B$ is de-asserted (i.e., returned to its non-asserted level) after both have been asserted, ME element $20_j$ supplies signals $I_{jA}$ and $I_{jB}$ at values representing the condition in which the other request is asserted first. This may involve internal changes in the condition of element $20_j$ depending on which of requests $R_A$ and $R_B$ was originally asserted first. Also, when both are de-asserted, element $20_j$ automatically returns to the initial state indicating no pairwise priority grant.

Both of requests $R_A$ and $R_B$ must be asserted before performing a conflict-resolution test sequence that involves reversing the pairwise priority grant of ME element $20_j$ in FIG. 4. Accordingly, assume that both have been asserted with request $R_A$ having been asserted first. Signal $I_{jA}$ is high, while signal $I_{jB}$ is low.

Test signal $T_A$ is now asserted by raising it to a high voltage. The output of gate $28_A$ goes to a high voltage level, enabling the output of gate $28_B$ to drop to a low voltage. Previously-on FETs $30$ and $32_B$ turn off, while previously-off FETs $30_B$ and $32_A$ turn on. FET $32_A$ pulls the input of inverter $36_A$ to a high voltage, causing signal $I_{jA}$ to go low. FET $30_B$ pulls the input of inverter $36_B$ to a low voltage, causing signal $I_{jB}$ to go high. Consequently, the pairwise priority grant is reversed.

If request $R_B$ has been asserted before request $R_A$, asserting test signal $T_B$ causes ME element $20_j$ to operate in the complementary way. Signals $I_{jA}$ and $I_{jB}$ thereby switch from indicating $R_B/R_A$ to indicating $R_A/R_B$.

When ME element $20_j$ of FIG. 4 is a conflict-elimination ME element, the operation is the same as that just described except that control signals $C_A$ and $C_B$ respectively replace test signals $T_A$ and $T_B$. In particular, both of requests $R_A$ and $R_B$ must be asserted prior to resolving a priority conflict that necessitates reversing the pairwise priority grant of element $20_j$.

While the invention has been described with reference to particular embodiments, this description is solely for the purpose of illustration and is not to be construed as limiting the scope of the invention claimed below. For example, under deMorgan's theorem "OR" gates $28_A$ and $28_B$ in each ME element 20 of FIG. 4 could be replaced with "NAND" gates whose inputs are inverted for signals $R_A$, $R_B$, $T_A$ or $C_A$, and $T_B$ or $C_B$. These inverted inputs could be shifted to other places in the arbiter to reverse the polarities of requests $R_A$ and $R_B$ and/or signals $T_A$ or $C_A$ and $T_B$ or $C_B$.

The present test technique could be applied to an ME-based arbiter, such as that described in U.S. Pat. No. 4,835,422, in which the signal path goes through the conflict-resolving logic during all priority determinations. Various modifications and applications may thus be made by those skilled in the art without departing from the true scope and spirit of the invention as defined in the appended claims.

We claim:

1. An electronic circuit for generating an absolute priority signal which indicates that one of at least three request signals has gained absolute priority over all the other request signals, the circuit comprising:
   mutual-exclusion ("ME") means formed with at least three ME elements each of which is generally responsive to a respective, different pair of the request signals for producing an intermediate priority signal at a value indicating that one of that pair of request signals has gained pairwise priority over the other of that pair of request signals, priority conflicts among the request signals being indicated by the intermediate priority signals, at least one of the ME elements being responsive to an externally originated test signal when the test signal is asserted for causing that ME element to reverse its pairwise priority determination and thereby produce its intermediate priority signal at a value indicating that the other of its pair of request signals has gained pairwise priority over the one of its pair of request signals.

2. A circuit as in claim 1 further including resolving/decoding means for resolving priority conflicts among the request signals and decoding the intermediate priority signals to produce the absolute priority signal.

3. A circuit as in claim 2 wherein each intermediate priority signal comprises of at least two bits.

4. A circuit as in claim 3 wherein each absolute priority signal comprises of at least three bits.

5. A circuit as in claim 2 wherein: the resolving/decoding means generates a control signal and selectively asserts the control signal upon determining that a priority conflict exists among the request signals; and an ME element is responsive to such a control signal, when asserted due to a priority conflict among the request signals, for causing that ME element to reverse its pairwise priority determination and thereby produce its intermediate priority signal at a value indicating that the other of its pair of request signals has gained pairwise priority over the one of its pair of request signals.

6. A circuit as in claim 5 wherein no ME element is responsive to both a control signal and a test signal.

7. A method of testing an electronic circuit that generates an absolute priority signal to indicate that one of at least three request signals has gained absolute priority over all the other request signals, the circuit comprising (a) mutual-exclusion ("ME") means formed with at least three ME elements each of which is generally responsive to a respective, different pair of the request signals for producing an intermediate priority signal, priority conflicts among the request signals being indicated by the intermediate priority signals, and (b) resolving/decoding means for resolving priority conflicts among the request signals and decoding the intermediate priority signals to produce the absolute priority signal, the method comprising the steps of:

asserting at least two of the request signals in a way that avoids a priority conflict among the request signals, each of certain specified ME elements producing its intermediate priority signal at a value indicating that one of its pair of request signals has gained pairwise priority over the other of its pair of request signals;

forcing a selected one of the specified ME elements to reverse its pairwise priority determination and thereby produce its intermediate priority signal at a value indicating that the other of its pair of request signals has gained pairwise priority over the one of its pair of request signals such that the values of the intermediate priority signals now indicate that a priority conflict appears to exist among the request signals; and monitoring the circuit to determine whether the apparent priority conflict has been resolved in the expected way for that conflict had it been a real one.

8. A method as in claim 7 wherein at least three of the request signals are asserted during the asserting step.

9. A method as in claim 7 wherein each intermediate priority signal comprises of at least two bits.

10. A method as in claim 9 wherein the absolute priority signal comprises of at least three bits.

11. A method as in claim 7 wherein: the resolving/decoding means generates a control signal and selectively asserts the control signal upon determining that a priority conflict exists among the request signals; and an ME elements is responsive to such a control signal, when asserted due to a priority conflict among the request signals, for causing that ME element to reverse its pairwise priority determination and thereby produce its intermediate priority signal at a value indicating that the other of its pair of request signals has gained pairwise priority over the one of its pair of request signals.

12. A method as in claim 11 wherein the selected ME element i: not responsive to one such control signal.

13. A circuit, comprising:

first and second logic means each having at least two inputs and an output and each providing an output signal that is a logic function of at least two input signals comprising a request signal and the output signal of the other logic means, an inverting signal path extending through each logic means from its input where it receives the output signal of the other logic means to its output where it provides its output signal;

first and second transistors of a first polarity, each having a first flow electrode, a second flow electrode, and a control electrode for controlling current flow between the first and second flow electrodes, the outputs of the first and second logic means being respectively coupled to the first flow electrodes of the first and second transistors whose control electrodes are respectively coupled to the outputs of the second and first logic means; and first and second rectifying elements respectively coupled across the first and second transistors between their first and second flow electrodes in current-flow directions opposite to current flow directions of the first and second transistors.

14. A circuit as in claim 13 further including third and fourth transistors of a second polarity opposite to the first polarity, each having a first flow electrode, a second flow electrode, and a control electrode for controlling current flow between their respective first and second flow electrodes the second flow electrodes of the first and second transistors being respectively coupled to the second flow electrodes of the third and fourth transistors, the first flow electrodes of the third and fourth transistors are for coupling to a voltage supply and the control electrodes of the third and fourth transistors are respectively coupled to the outputs of the second and first logic means.

15. A circuit as in claim 14 wherein each transistor is a field-effect transistor.

16. A circuit as in claim 15 wherein each rectifying element is a diode.

17. A circuit as in claim 14 wherein the input signals to each logic means include a further signal.

18. A circuit as in claim 17 wherein each further signal is a test signal.

19. A circuit as in claim 17 wherein each transistor is a field-effect transistor.

20. A circuit as in claim 19 wherein each rectifying element is a diode.

* * * * *